United States Patent [19]
Hasegawa

[11] Patent Number: 5,878,293
[45] Date of Patent: Mar. 2, 1999

[54] DATA IMPRINTING APPARATUS FOR A CAMERA

[75] Inventor: Hitoshi Hasegawa, Suwa, Japan

[73] Assignee: Seiko Epson Corporation, Tokyo, Japan

[21] Appl. No.: 965,478

[22] Filed: Nov. 6, 1997

[30] Foreign Application Priority Data

Nov. 29, 1996 [JP] Japan ..................................... 8-319844

[51] Int. Cl.[6] .................................................. G03B 17/24
[52] U.S. Cl. ........................... 396/317; 396/318; 349/110
[58] Field of Search .................................... 396/316, 317, 396/318; 349/86, 110

[56] References Cited

U.S. PATENT DOCUMENTS

| | | |
|---|---|---|
| 4,232,956 | 11/1980 | Hashimoto et al. . |
| 4,361,388 | 11/1982 | Mlcak et al. . |
| 4,552,437 | 11/1985 | Gantenbrink et al. . |
| 5,389,991 | 2/1995 | Naka et al. . |
| 5,434,688 | 7/1995 | Saitoh et al. . |
| 5,517,266 | 5/1996 | Funaki et al. . |
| 5,721,990 | 2/1998 | Akaiwa et al. ......................... 396/310 |

*Primary Examiner*—David M. Gray
*Attorney, Agent, or Firm*—Mark P. Watson

[57] ABSTRACT

A data imprinting apparatus for a camera prevents image dropout and loss of image sharpness in the imprinted image even when the path length from the light source to the data imprinting LCD is shortened, or when the diffusion angle of the emitted light is increased. In a camera data imprinting apparatus 1 the relationship between the position of a segment 630 on the liquid crystal panel 604 and the position of a light transmitting segment 660 on the light mask 622 is determined with consideration given to the diffusion angle of the emitted light so that the corresponding light transmitting segment 660 of the light mask 622 is positioned within the illumination area 640 formed on the light mask 622 by light passing a segment 630 switched to the light transmitting state. The illumination area 640 is thus formed at a position which is not partially offset from the light transmitting segment 660 of the light mask. Partial dropout of the imprinted data image, or partial loss of sharpness, can thus be avoided.

8 Claims, 9 Drawing Sheets

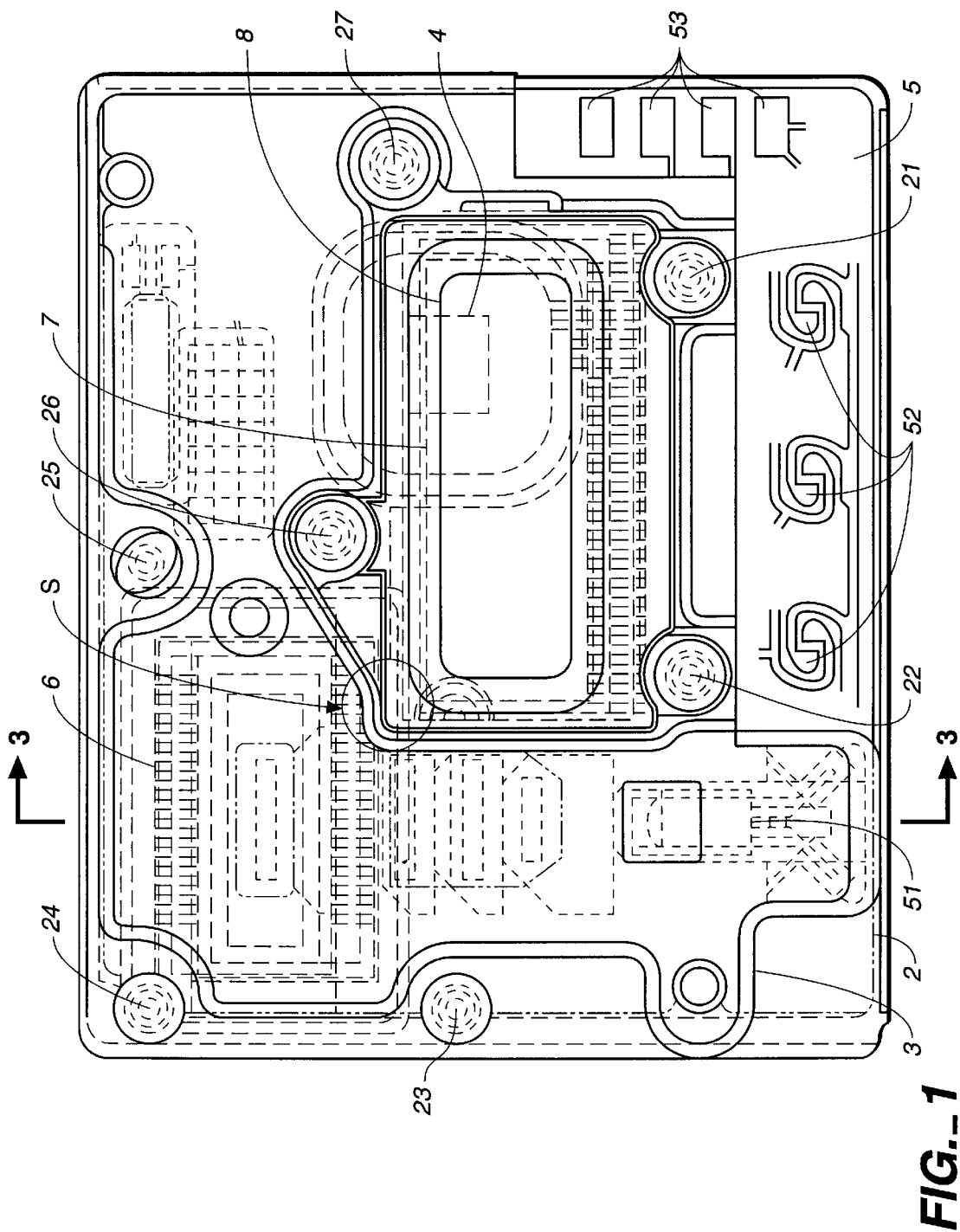
FIG._1

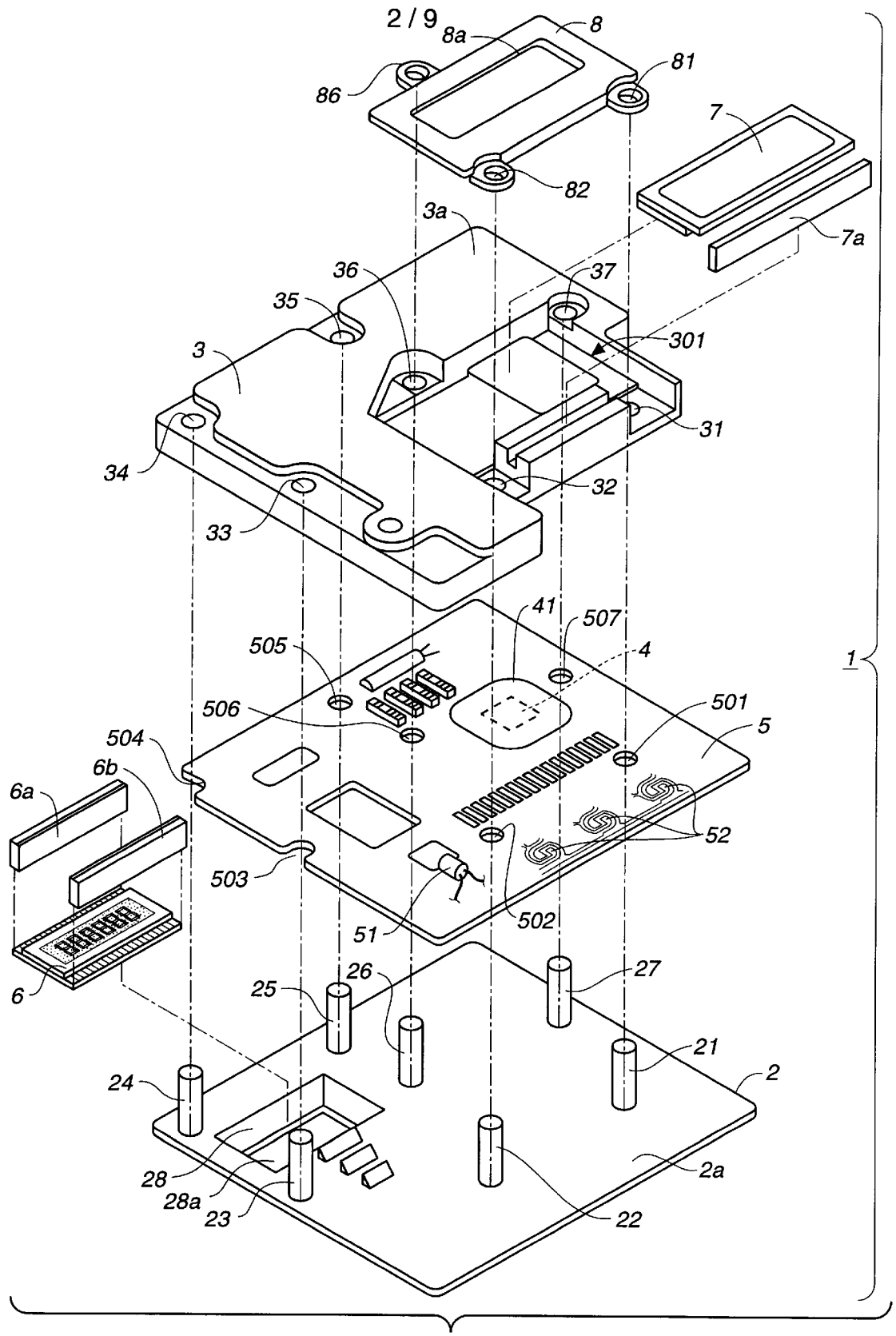
FIG._2

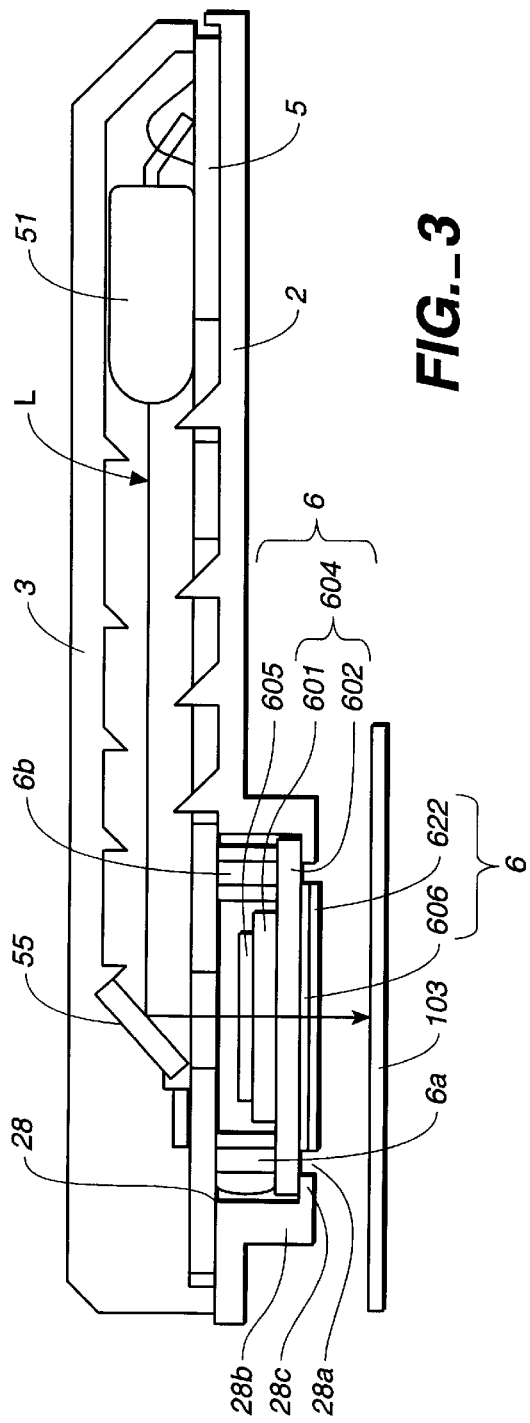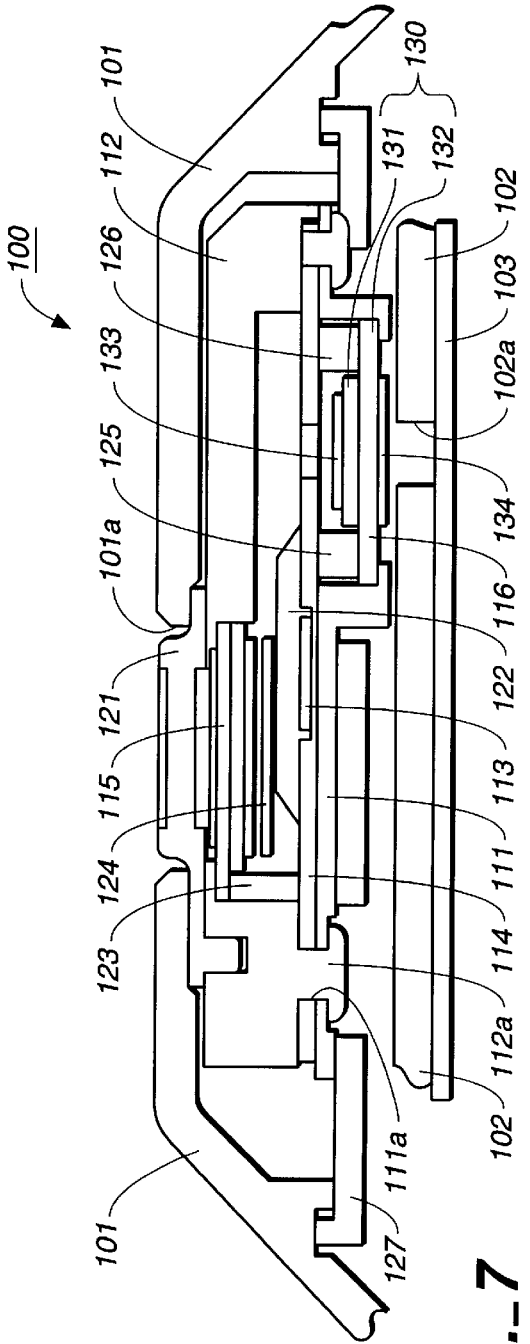
FIG._3
FIG._7 (PRIOR ART)

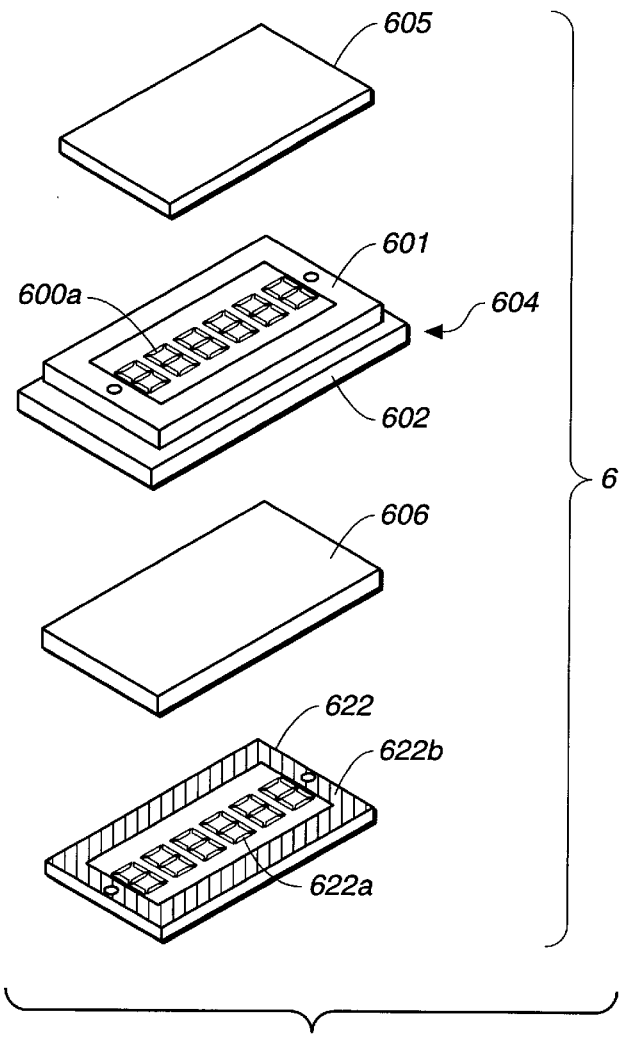
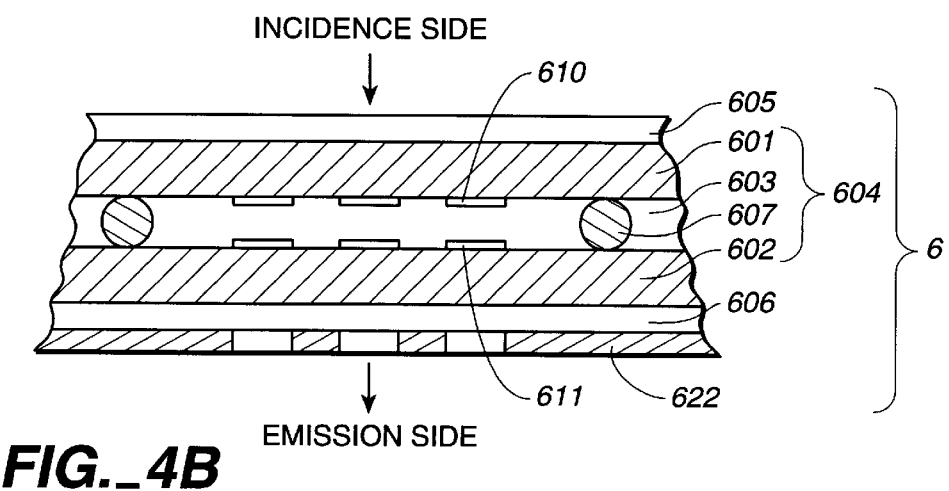
FIG._4A
FIG._4B

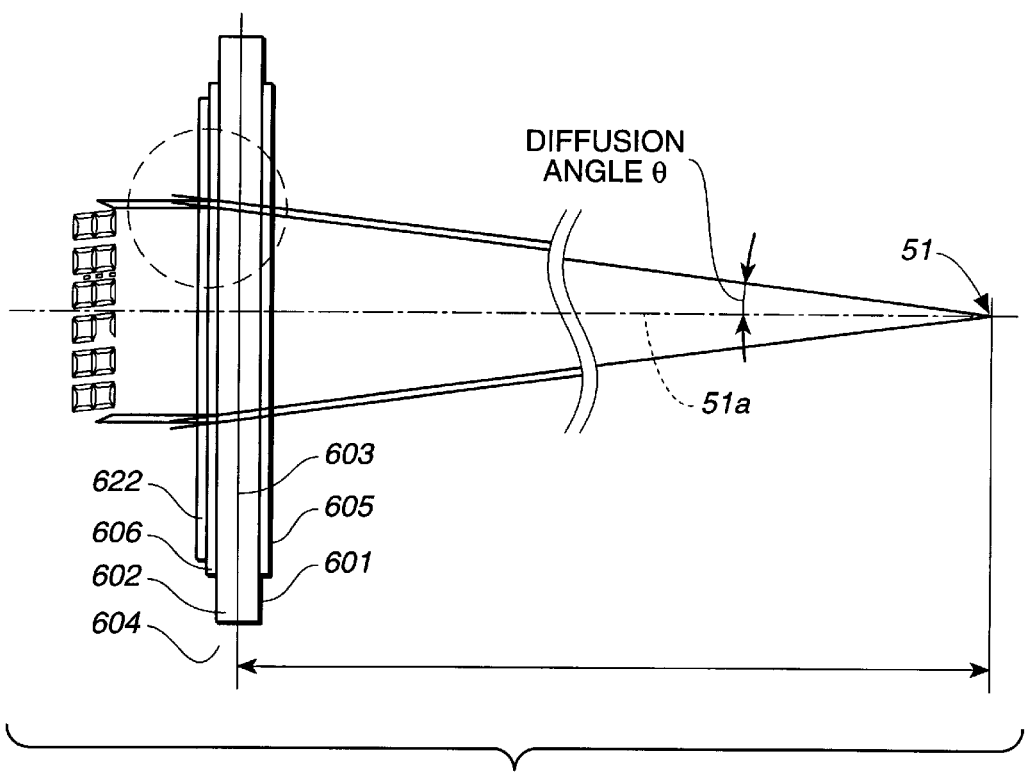
FIG._5A
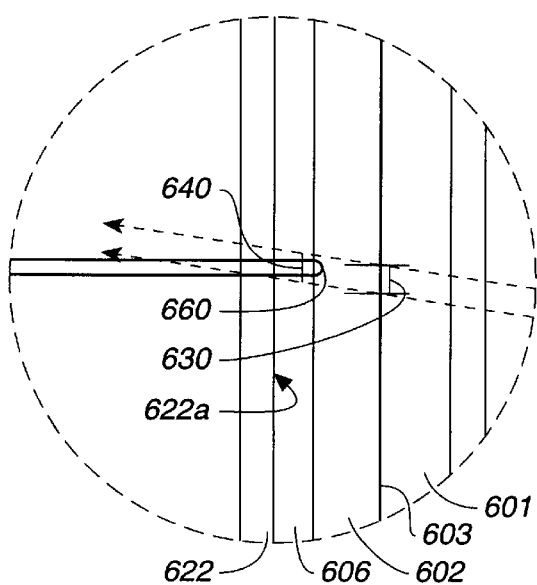
FIG._5B
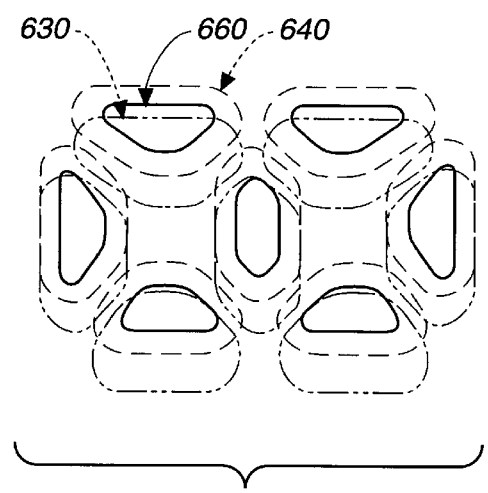
FIG._5C

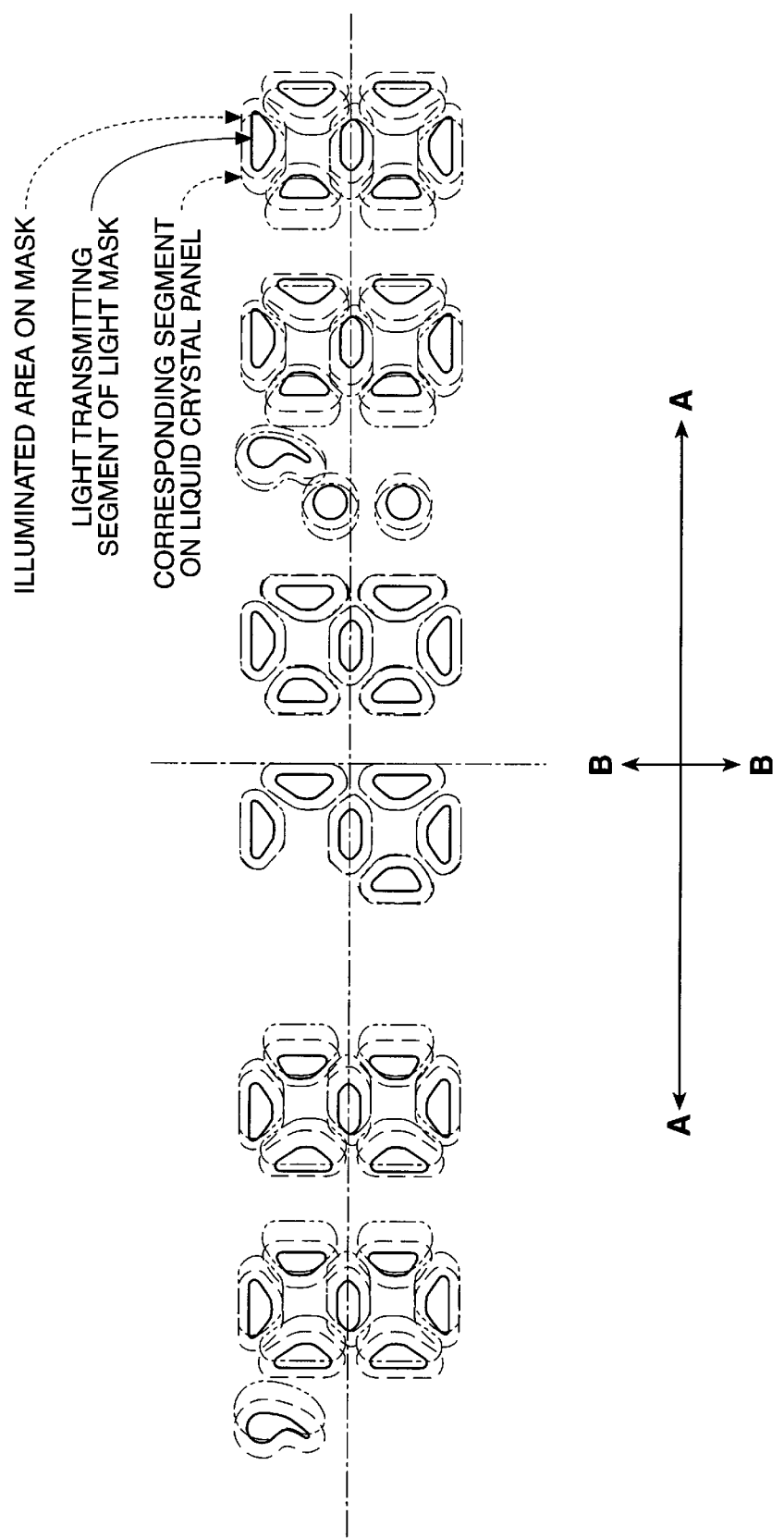
FIG._6

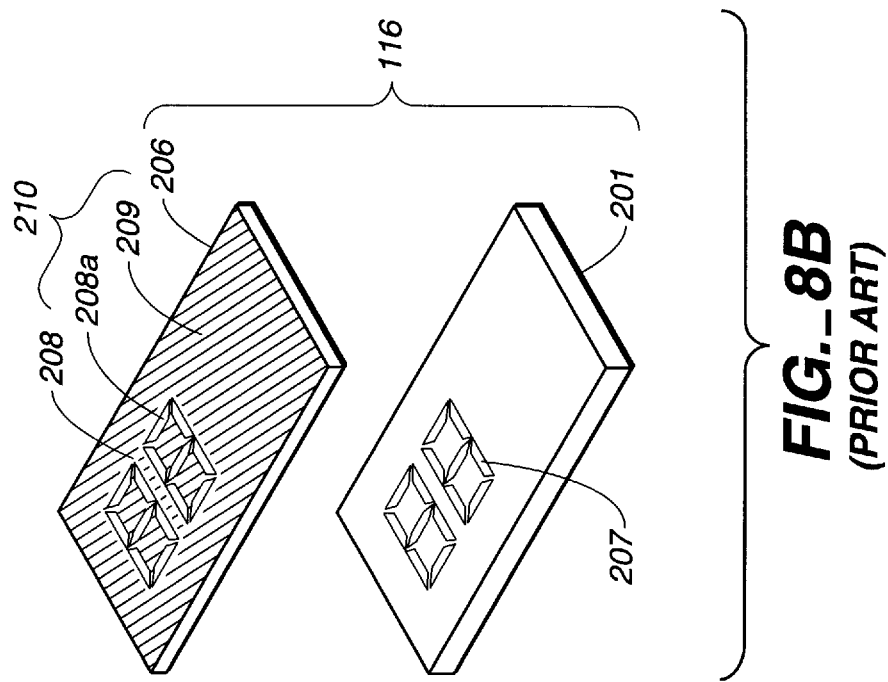
FIG._8B
(PRIOR ART)
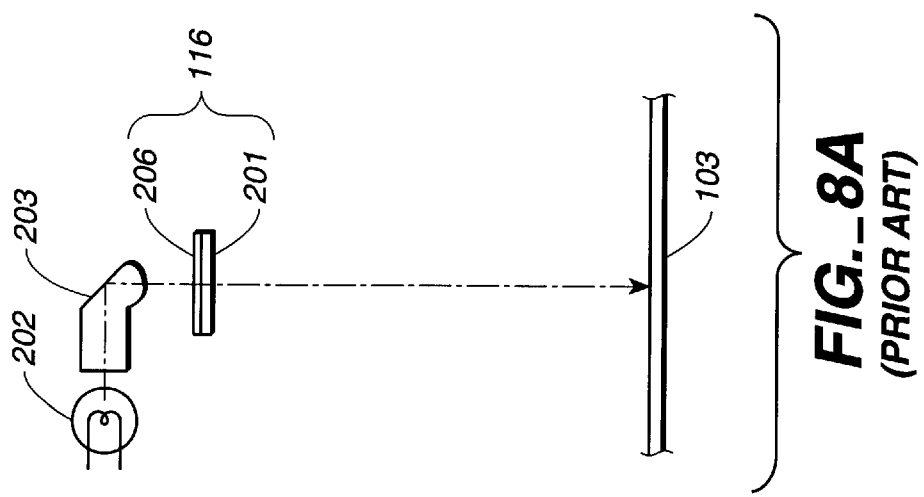
FIG._8A
(PRIOR ART)

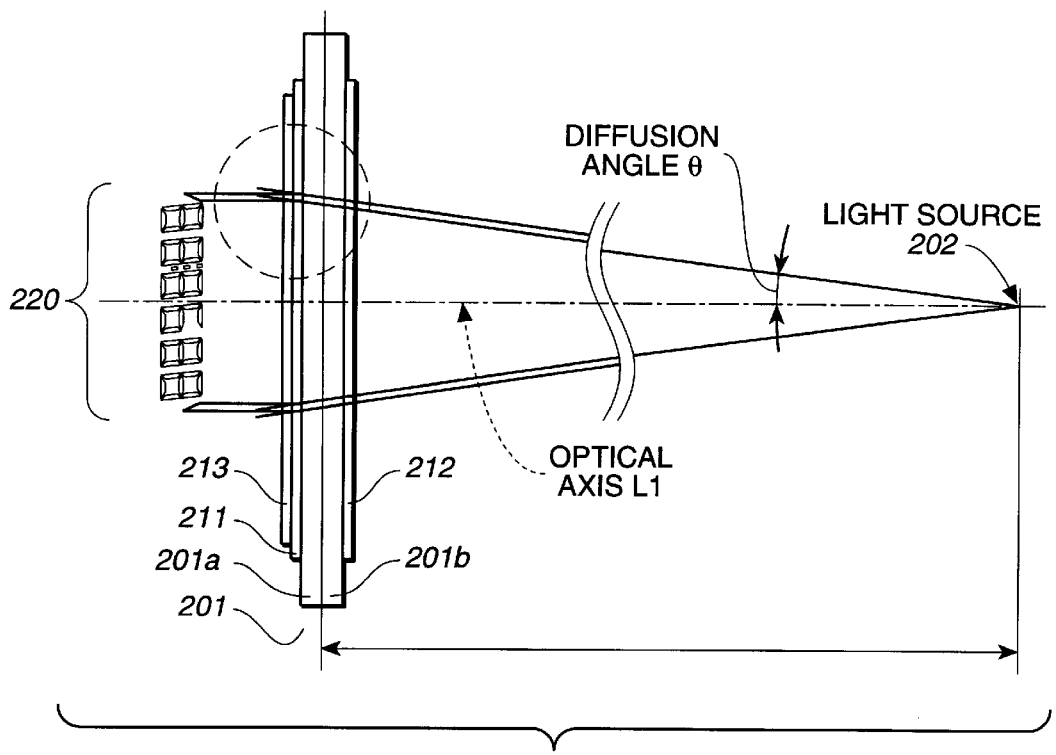
FIG._9A
(PRIOR ART)
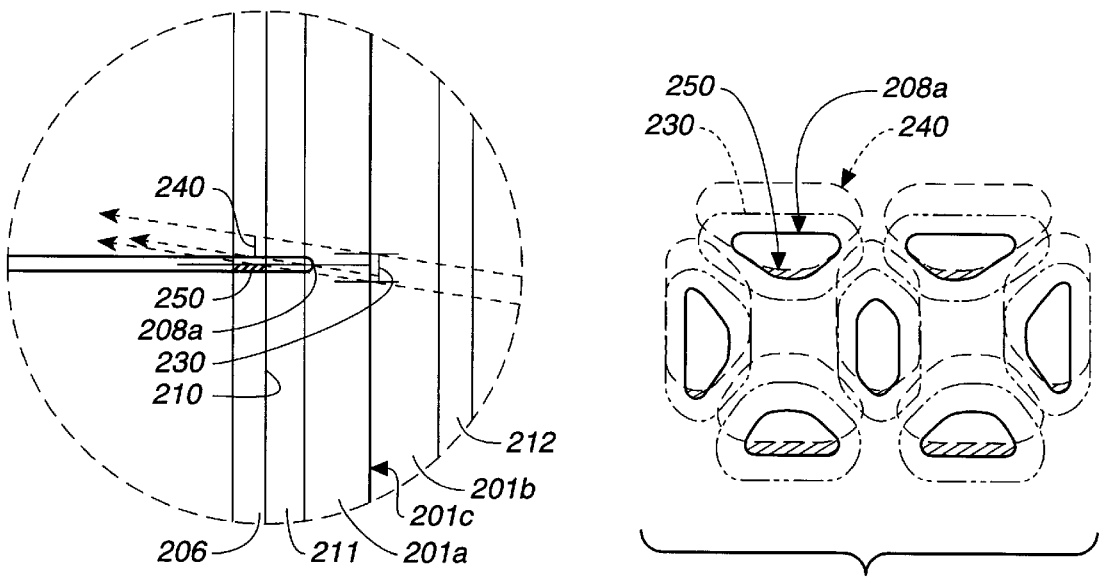
FIG._9B
(PRIOR ART)
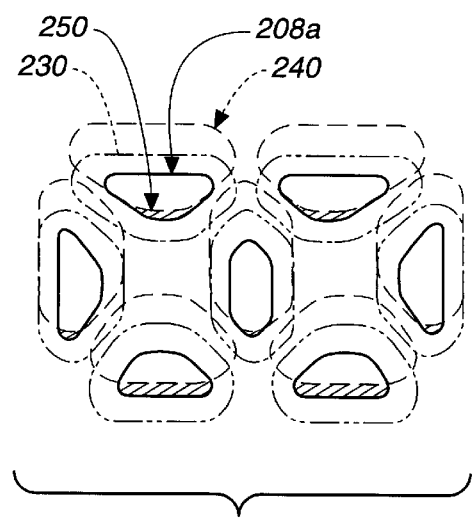
FIG._9C
(PRIOR ART)

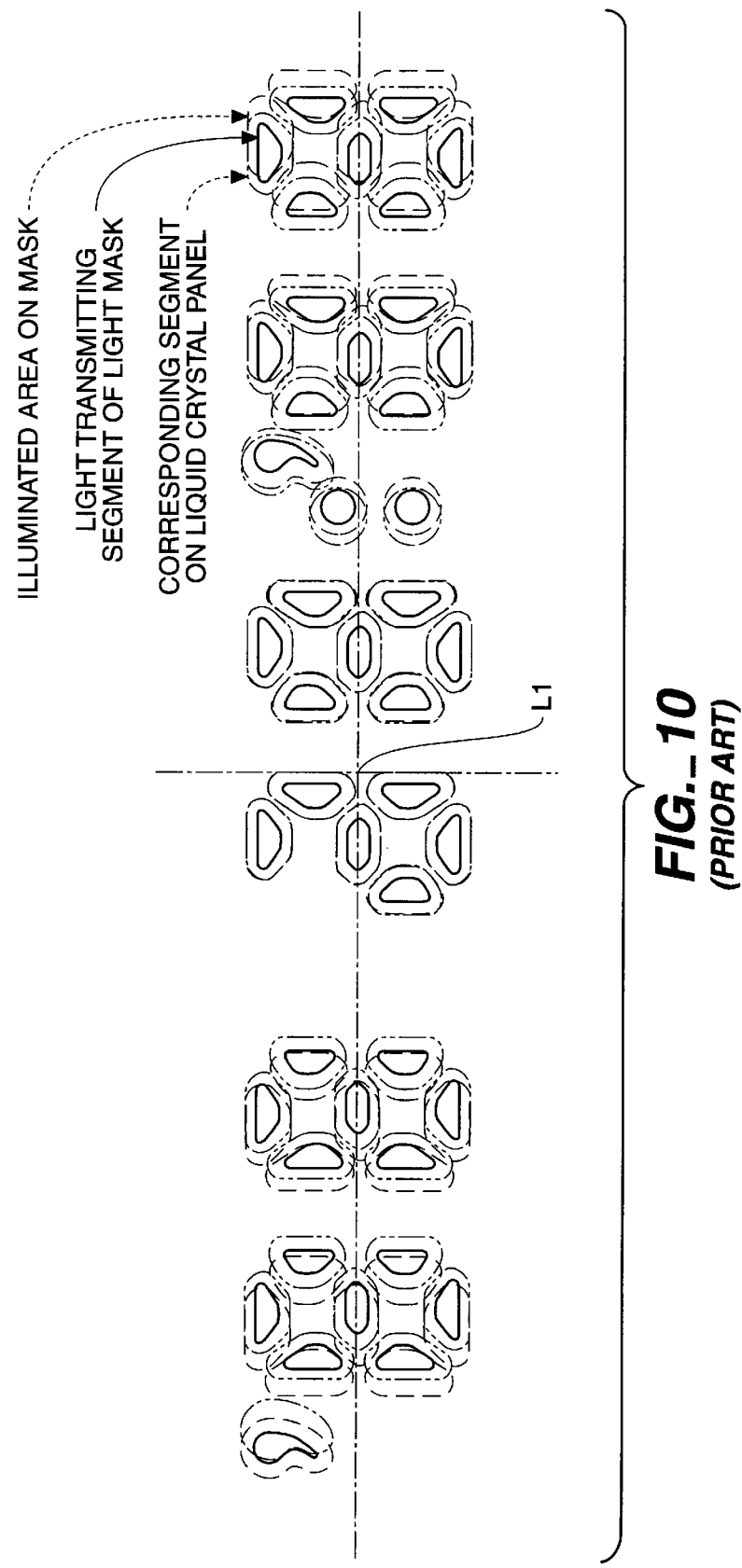

DATA IMPRINTING APPARATUS FOR A CAMERA

BACKGROUND OF THE INVENTION

1. Field of the Invention

The present invention relates to a data imprinting apparatus for a camera used for transferring a data pattern formed on a liquid crystal panel to photographic film. More particularly, the present invention relates to a data imprinting apparatus for a camera whereby a clear data image can be imprinted on film when the path length from the data imprinting light source to the liquid crystal panel is short, and when the diffusion angle is wide.

2. Description of the Related Art

The typical structure of a data imprinting apparatus for imprinting date information and other data to photographic film inside a camera is shown in FIG. 7. As shown in FIG. 7, this data imprinting apparatus 100 for a camera is disposed inside the camera in a space between a back cover 101 on the camera body and a pressure plate 102 disposed substantially parallel to the back cover 101 on the inside of the camera. The film 103 travels through a film path disposed on the side of the pressure plate 102 opposite that facing the back cover 101. The date, time, or other information is imprinted on the film 103 through an opening 102a in pressure plate 102.

The data imprinting apparatus 100 comprises a circuit board 114 on which an IC chip 113 is mounted, a liquid crystal display (LCD) 115 for monitoring the imprinted data, and a liquid crystal display (LCD) 116 for imprinting data, each disposed between a first frame 111 and a second frame 112. The frames 111 and 112 are fastened together by passing plural pins 112a formed on one side of the second frame 112 through matching plural holes 111a formed on one side of the first frame 111, and then crimping the heads of the pins 112a.

Various data is displayed for the operator on the monitor LCD 115. The monitor LCD 115 is fastened to the inside face of the second frame 112. The exposed surface of the monitor LCD 115 is protected by a glass cover 121 attached to second frame 112 with the surface of glass cover 121 exposed to the outside through opening 101a in back cover 101. The imprinting LCD 116 is mounted on the inside surface of the first frame 111 at a position opposing opening 102a in pressure plate 102.

IC chip 113 mounted on circuit board 114 is covered and protected by a molding 122. A signal such as a drive signal is supplied from circuit board 114 to monitor LCD 115 through a flexible connector 123. The flexible connector 123 also functions as a support plate that presses against the back, i.e., the inside surface, of the monitor LCD 115 and holds monitor LCD 115 against second frame 112. A spacer 124 prevents flexible connector 123 from tilting over, and prevents monitor LCD 115 from tilting in.

The imprinting LCD 116 positioned on the opposite side of circuit board 114 is similarly electrically connected to circuit board 114 by a pair of right and left connectors 125 and 126, which press and hold imprinting LCD 116 against first frame 111.

A data imprinting apparatus 100 thus comprised is fastened inside the camera body by mounting plate 127.

A typical optical imprinting system using imprinting LCD 116 is shown in FIGS. 8A and 8B. The components of this optical system are built in to the data imprinting apparatus 100. The imprinting LCD 116 comprises a liquid crystal panel 201 including a liquid crystal material sealed between a pair of electrode plates in a construction whereby the data pattern to be imprinted on the photographic film 103 can be formed as a light transmitting part of the panel. The emitted light from a light source lamp 202 is guided to the liquid crystal panel 201 by a reflecting mirror 203. The liquid crystal panel 201 blocks any extra light that is not part of the data pattern, and passes the remaining light to the photographic film 103 as the data pattern. As a result, a data image corresponding to the data pattern is imprinted on photographic film 103.

However, liquid crystal panel 201 alone is not sufficient to block all extraneous light, and the contour of the data image imprinted on the photographic film 103 through the light transmitting part of the liquid crystal panel 201 is not sharp if only liquid crystal panel 201 is used as a light shield. To avoid this problem, a light mask 206 for blocking light has conventionally been disposed between the light source lamp 202 and liquid crystal panel 201.

As shown in FIG. 8B, light mask 206 disposed for this purpose comprises a light mask surface 210 including a light transmitting part 208 and a light shield part 209 in the area outside the light transmitting part. The light transmitting part 208 is defined by plural light transmitting segments 208a, which are formed in an area and shape corresponding to and overlaying the segments 207 of the liquid crystal panel 201 in which the data pattern is formed. As a result, extraneous light is blocked from the light emitted to the liquid crystal panel 201 by this light mask 206.

It should be noted that the light mask 206 is typically made by forming a metallic film in a particular pattern on a glass substrate by means of plating, vapor deposition, or other film formation technique, leaving the areas in which the metallic film is not formed as light transmitting part 208.

As will be evident from the above description, extraneous light is removed from the light incident to the liquid crystal panel 201 by the disposition of light mask 206 in a data imprinting apparatus for a camera constructed as described above. However, light passing through liquid crystal panel 201 also diffuses upon passage. As a result, the loss of data image sharpness resulting from this diffusion is not completely prevented. One possible method of avoiding this problem is to place the light mask 206 on the side of the liquid crystal panel 201 from which light is emitted (the light emission side).

As shown in FIG. 9A, another method of avoiding this problem, as proposed by the inventor is attaching polarizing plates 211 and 212 each on a side of the two glass electrode panels 201a and 201b, respectively, comprising liquid crystal panel 201, and then attaching a shield mask 213 on the surface of the polarizing plate 211 on the light emission side. A loss of sharpness in the data image resulting from diffusion of light passing liquid crystal panel 201 can be prevented by thus disposing shield mask 213 on the light emission side of the liquid crystal panel 201.

While such parameters as the path length from the data imprinting light source to the liquid crystal panel and the diffusion angle of emitted light are generally constant in this type of data imprinting apparatus for a camera, it is necessary to further shorten the path length, for example, to achieve a smaller, more compact data imprinting apparatus. If the length of the data pattern that can be imprinted on film is constant, shortening the path length necessarily increases the diffusion angle of the emitted light. As a result, sharpness of the data image at both ends of the imprinted data pattern can be lost. The reason for this loss of sharpness is described below.

As shown in FIG. 9A, the diffusion angle ∅ of the light emitted from light source lamp 202 and incident on liquid crystal panel 201 increases with the distance from the optical axis L1 of the emitted light; as measured on the perpendicular. The diffusion angle of light emitted to the segments of the liquid crystal panel 201 corresponding to the end areas of the imprintable data pattern 220 is therefore greater than the diffusion angle of segments nearer the optical axis.

FIG. 9B is an enlarged view of the area of the dotted circle in FIG. 9A, i.e., the area at one end of data pattern 220. Plural segments that can be switched between light transmitting and non-transmitting states are formed in liquid crystal panel 201 in a liquid crystal layer 201c sealed between a pair of glass electrode plates 201a and 201b as shown in FIG. 9A. It is assumed in the following explanation that segment 230 is a segment at the farthest outside edge of the imprintable data pattern. The transmission width of segment 230 is indicated by two dotted lines in FIG. 9B. If the refractive index of the liquid crystal panel components is ignored, light transmitted by segment 230 passes at the diffusion angle ∅ of the emitted light.

Light transmitting segment 208a is formed on the light mask surface 210 of light mask 206 in a plane perpendicular to the optical axis L1 at a position corresponding to segment 230 in the liquid crystal panel. In general, the width of a segment 230 formed on the liquid crystal panel by a liquid crystal panel electrode pattern, which can be switched between light transmitting and non-transmitting states, is greater than the width of a light transmitting segment 208a on the light mask side, and the widthwise center positions of light transmitting segment 208a on the light mask side and a corresponding segment 230 on the liquid crystal panel side are aligned, i.e. coplanar in a plane parallel to the optical axis L1.

As a result, when light transmitted through segment 230, switched to a light transmitting state, on the liquid crystal panel side diffuses at a constant diffusion angle ∅ and reaches light mask surface 210 of light mask 206, an illumination area 240 is formed offset, on a perpendicular to the optical axis L, from light transmitting segment 208a on the light mask side. This does not create a problem if the entire transmitted light segment 230 on the light mask side is contained within illumination area 240. However, if the diffusion angle ∅ is great and the electrode plates of the liquid crystal panels that are used are thick, illumination area 240 may be formed at a position not completely covering light transmitting segment 230.

If part of illumination area 240 is removed from light transmitting segment 230, part of the light passing through segment 230 on the liquid crystal panel side will be blocked by the shield part of the light mask as shown by the diagonal dotted line in FIG. 9B. This blocked light is indicated as light 250. As shown in FIG. 9C this results in partial dropout of the transmitted light pattern, which corresponds to the data pattern to be imprinted on the photographic film. This dropout thus prevents formation of a complete, sharp data image.

While the greatest potential for partial dropout of the light transmitted for data imprinting is at both ends of the data pattern, dropout can also occur in other parts of the data pattern. This is because the illuminated area formed on the light mask surface by light transmitted through a segment on the liquid crystal panel side shifts in a direction increasing in distance from the optical axis L1 as shown in FIG. 10. The light transmitting segments of the light mask are indicated by a solid line in FIG. 10, the area of the corresponding segment on the liquid crystal panel is indicated by a dot-dot-dash line, and the illuminated area formed on the light mask by light transmitted through a corresponding segment on the liquid crystal panel is indicated by a dotted line.

It is significant to note that the effect of this offset from the optical axis in the formation of an illuminated area on the light mask by light transmitted by a segment of the liquid crystal panel has not been previously addressed, and there are no proposals for a solution to this problem in the literature.

OBJECTS OF THE INVENTION

Therefore, it is an object of the present invention to overcome the aforementioned problems.

Another object of the present invention is to provide a data imprinting apparatus for a camera whereby it is possible to prevent loss of image sharpness, dropout of the imprinted data image, and other effects resulting from the illuminated area formed on the light mask by light transmitted by a segment of the liquid crystal panel being offset relative to the position of the light transmitting segment on the light mask.

SUMMARY OF THE INVENTION

To achieve the above objects, the present invention provides a data imprinting apparatus for a camera, comprising a liquid crystal panel for forming a data pattern to be imprinted on photographic film by plural segments that can be switched to a light transmitting state, and a light mask comprising plural light transmitting segments corresponding to an imprintable data pattern. The data imprinting apparatus for a camera, hereafter "camera data imprinting apparatus," imprints data by exposing an imprinting surface of the photographic film to emitted light from a light source passed through the liquid crystal panel and the light mask. In a preferred embodiment of the invention, the data imprinting apparatus comprises the light mask disposed on a light emitting side of the liquid crystal panel, and comprises at least one light transmitting segment of the light mask formed in a position offset relative the corresponding segment of the liquid crystal panel in a direction perpendicular to an optical axis of the emitted light in such a manner that the light transmitting segment of the light mask is within the area of the light mask illuminated by light emitted from the corresponding liquid crystal panel segment.

In a camera data imprinting apparatus according to the present invention thus comprised, light passing a segment of the liquid crystal panel in a light transmitting state illuminates all parts of a corresponding light transmitting segment on the light mask. It is therefore possible to avoid such effects as partial loss of image definition and image sharpness as a result of insufficient exposure, or partial dropout of the imprinted data pattern, particularly at the ends of the pattern, when the path length from the light source to the liquid crystal panel is short, or when the diffusion angle of emitted light from the light source is wide.

It is significant to note here that it is only necessary to form a light transmitting segment of the light mask in a position offset relative to the corresponding segment of the liquid crystal panel in a direction increasing in distance from and perpendicular to the optical axis, which is the same general direction as the orientation of the imprintable data pattern. This is because the imprinted data pattern is generally a single linear sequence of one or more letters, numbers, or symbols. In the direction transverse to this linear data pattern orientation the pattern length is the size of just one letter, number, or symbol. There is, therefore, substantially no offset in such transverse direction in the position of the light mask area illuminated by light passed by the liquid crystal panel, and it is therefore not necessary to consider any deleterious effect of such offset on the practical imprinting of a data pattern image.

For purposes of determining the amount of the relative offset between the light transmitting segment of the light mask and the liquid crystal panel segment corresponding thereto, it is furthermore only necessary to consider either the diffusion angle of the emitted light, or the refractive index of the optical path from the light source to the light mask.

It should be further noted that the light mask of a camera data imprinting apparatus according to the present invention can be disposed on the side of the liquid crystal panel from which light is emitted, or on the side of the liquid crystal panel to which light from the light source is incident. When the light mask is on the incidence side of the liquid crystal panel, the objects of the invention can be achieved by forming at least one segment of the liquid crystal panel in a position offset relative to the corresponding light transmitting segment of the light mask in a direction perpendicular to an optical axis of the emitted light in such a manner that the area of the liquid crystal panel illuminated by the light transmitted by the light transmitting segment of the light mask is within the liquid crystal panel segment.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 1 is a plan view of a data imprinting apparatus for a camera according to a preferred embodiment of the present invention;

FIG. 2 is a partially exploded view of the data imprinting apparatus for a camera shown in FIG. 1;

FIG. 3 is a cross sectional view of the optical system for data imprinting through line III—III in FIG. 1;

FIG. 4A is a partially exploded view of the data imprinting LCD of the data imprinting apparatus for a camera shown in FIG. 1, and FIG. 4B is a cross sectional view thereof;

FIGS. 5A–5C show the relationship between the position of the liquid crystal panel segments and the position of the light transmitting segments of the light mask according to the present invention. FIG. 5A shows the offset of the illumination area formed on the light mask by light passing the liquid crystal panel as a result of the diffusion angle of the light emitted from the light source. FIG. 5B is an enlarged view of the liquid crystal panel near the end of the data pattern. FIG. 5C shows the relative positions of the liquid crystal panel segments, the illumination area formed on the light mask by light passing the liquid crystal panel, and the light transmitting segments of the light mask;

FIG. 6 shows the relationship between the positions of the liquid crystal panel segments and the light transmitting segments of the light mask;

FIG. 7 is a cross sectional view showing the structure of a data imprinting apparatus for a camera according to the prior art;

FIGS. 8A and 8B show the optical system for data imprinting in the data imprinting apparatus for a camera shown in FIG. 7, with FIG. 8B showing a more detailed view of the liquid crystal display for imprinting data;

FIG. 9A shows the relationship between the position of liquid crystal panel segments and the position of the light transmitting segments of the light mask in the data imprinting apparatus for a camera shown in FIG. 7, and FIGS. 9B and 9C show the effects of this relationship; and FIG. 10 shows the relationship between the position of liquid crystal panel segments and the position of the light transmitting segments of the light mask in the data imprinting apparatus for a camera shown in FIG. 7, and the effects of this relationship.

DESCRIPTION OF THE PREFERRED EMBODIMENTS

A data imprinting apparatus for a camera according to the present invention is described next with reference to the accompanying figures.

The overall configuration of a data imprinting apparatus for a camera according to the present invention, which is referred to below as camera data imprinting apparatus 1, is described below with reference to the plan figure thereof in FIG. 1, and the partially exploded view thereof in FIG. 2. As shown in FIG. 2, camera data imprinting apparatus 1 according to the present invention comprises a circuit board 5, on which is mounted an IC chip 4, disposed between a first frame plate 2 and a second frame plate 3.

Formed integrally with first frame plate 2 are a plurality of pins rising vertically from the inside surface 2a of first frame plate 2. In the exemplary camera data imprinting apparatus 1 shown in FIG. 2 seven such pins 21 to 27 are shown by way of example only. A rectangular recess 28 is also formed in the first frame plate 2 and defines on the inside thereof a rectangular opening 28a A liquid crystal display (LCD) 6 device for data imprinting is mounted in recess 28, and is electrically connected to circuit board 5 by means of two connector blocks 6a and 6b.

In addition to IC chip 4, a data imprinting light source 51, switch group 52, and connector terminal group 53 for establishing a connection with the camera body, are mounted on circuit board 5. The surface of IC chip 4 is covered and protected by a molding 41. A plurality of through-holes or notches 501 to 507 through which corresponding pins 21 to 27 are passed is also formed in circuit board 5.

A plurality of through-holes 31 to 37 through which corresponding pins 21 to 27 are also passed is also formed in second frame plate 3. A mounting member 301 for liquid crystal display (LCD) 7 for monitoring is formed on the outside surface 3a side of second frame plate 3 in an area substantially opposite the area of circuit board 5 on which IC chip 4 is mounted. Monitor LCD 7 is mounted from the outside to this mounting member 301, and display frame 8 is then fastened to second frame plate 3 with monitor LCD 7 disposed therebetween. Through-holes 81, 82, and 86 corresponding to pins 21, 22, and 26 in FIG. 2 are also formed in display frame 8.

Monitor LCD 7 is electrically connected to circuit board 5 by of connector block 7a.

A data signal is supplied from IC chip 4 on circuit board 5 through connector blocks 6a and 6b to data imprinting LCD 6. In the present exemplary embodiment of the invention, data imprinting LCD 6 comprises a plurality of seven-segment display units, each of which forms the shape of one letter, number, or symbol (hereafter, one character), in a single linear arrangement. As is well known, a segment corresponding to any part of a character (data) to be imprinted is set to a light transmitting state and is considered to be on, and segments corresponding to any other part of a character are held in a non-transmitting (mask) state, and are considered to be off. Segments are thus switched on or off to create the data pattern to be imprinted on the photographic film such that light emitted from data imprinting light source 51 passes through the light transmitting "on" segments and exposes the film.

It should be noted that camera data imprinting apparatus 1 according to the present embodiment is assembled with the components mounted together sequentially in one direction from one side to the other. More specifically with reference to FIG. 2, the first frame plate 2 is first placed with inside surface 2a thereof facing up. The data imprinting LCD 6 is then placed in LCD mounting recess 28 of first frame plate 2, and connector blocks 6a and 6b are positioned over data imprinting LCD 6.

Circuit board 5 is next positioned relative to first frame plate 2 such that through-holes or notches 501 to 507 are aligned with pins 21 to 27, and circuit board 5 is then lowered onto first frame plate 2. Second frame plate 3 is then similarly positioned relative to first frame plate 2 such that through-holes 31 to 37 are aligned with pins 21 to 27, and second frame plate 3 is then lowered onto circuit board 5.

Next, connector block 7a is positioned inside mounting member 301 formed in the outside surface 3a of second frame plate 3, and monitor LCD 7 is then mounted over connector block 7a. Once monitor LCD 7 is in place, display frame 8 is positioned with through-holes 81, 82, and 86 aligned with pins 21, 22, and 26, and lowered onto monitor LCD 7.

The various components of camera data imprinting apparatus 1 are thus assembled in sequence onto first frame plate 2. Thereafter, the exposed ends of pins 21 to 27 are deformed, crimped or flattened by thermal, mechanical, or other means to hold the assembly securely together.

It should be noted that the camera data imprinting apparatus 1 according to the present invention is secured to a mounting member of a camera body in the same manner as the conventional data imprinting apparatus 100 shown in FIG. 7. As also described with reference to FIG. 7 above, when camera data imprinting apparatus 1 is so mounted to a camera body, monitor LCD 7 can be seen from the outside through opening 101a in back cover 101, and data imprinting LCD 6 is held opposite photographic film 103 inside the camera body through an opening 102a in pressure plate 102.

A cross sectional view of the optical system for data imprinting through line III—III in FIG. 1 is shown in FIG. 3. As shown in FIG. 3, light is emitted substantially parallel to the surface of the circuit board 5 from data imprinting light source 51 mounted on circuit board 5. A reflecting mirror 55 is mounted at an inclination of 45 degrees to the optical path L at a part of second frame plate 3 opposing the position of data imprinting LCD 6. This reflecting mirror 55 thus bends the optical path L perpendicularly to data imprinting LCD 6 such that light reflected by reflecting mirror 55 passes a light transmitting part of data imprinting LCD 6, passes opening 102a of pressure plate 102 inside the camera body, and thus exposes photographic film 103 positioned opposite data imprinting LCD 6.

The structure of data imprinting LCD 6 is described next below with reference to FIG. 3 and FIG. 4. The data imprinting LCD 6 comprises a liquid crystal panel 604, an incidence-side polarization plate 605 disposed on the light source side of liquid crystal panel 604, i.e., on the same side as data imprinting light source 51, and an emission-side polarization plate 606 disposed on the film side of liquid crystal panel 604, i.e., on the same side as the photographic film 103. The liquid crystal panel 604 comprises a liquid crystal material 603 sealed between a pair of glass electrode plates 601 and 602 (see FIG. 4 B), and is a negative type panel in which the electrodes transmit light when on.

The liquid crystal material 603 of liquid crystal panel 604 is sealed between electrode plate 601 on the side of liquid crystal panel 604 to which light from data imprinting light source 51 is incident, and electrode plate 602 on the side of liquid crystal panel 604 from which light is emitted. Electrode plate 601 is therefore referred to below as the incidence-side electrode plate 601, and electrode plate 602 as the emission-side electrode plate 602. Opposing transparent electrodes 610 and 611 for liquid crystal driving are formed on the surfaces of incidence-side electrode plate 601 and emission-side electrode plate 602 between which the liquid crystal material 603 is sealed. Liquid crystal material 603 is then sealed between incidence-side and emission-side electrode plates 601 and 602 by a sealant 607. A segment display unit 600a (FIG. 4A) comprising a plurality of character display segments is formed by opposing transparent electrodes 610 and 611. Note that the exemplary segment display unit 600a shown in FIG. 4A comprises a plurality of seven-segment character display units whereby individual characters can be expressed by turning the seven display segments on and off in various combinations, and comprises segment units for forming such symbols as a colon and comma.

A light mask 622 is additionally disposed on the emission side of emission-side polarization plate 606 to block extraneous light transmitted by other than display unit 600a, and to prevent light escaping as a result of, for example, liquid crystal orientation problems. As shown in FIG. 4 A, light mask 622 comprises a light transmitting part 622a and a mask part 622b where light transmitting part 622a is not present. The light transmitting part 622a comprises a plurality of light transmitting segments positioned in a manner described in further detail below relative to display unit 600a in which the data pattern to be imprinted is formed by liquid crystal panel 604. Note that mask part 622b is the shaded area and light transmitting part 622a is the white area in FIG. 4 A.

Note, further, that light mask 622 on the emission side of data imprinting LCD 6 can be formed by, for example, forming a metal vapor deposition film of nickel or chrome, or imparting a metallic plating, on the side of a transparent substrate 622 facing emission-side polarization plate 606.

The relationship, in a camera data imprinting apparatus 1 comprised as described above according to the present invention, between the position of each segment in the segment display unit 600a of liquid crystal panel 604, and the position of each light transmitting segment in the light transmitting part 622a of light mask 622, is described next below with reference to FIGS. 5A, B and C and FIG. 6.

As shown in FIG. 5A, emitted light from data imprinting light source 51 diffuses at diffusion angle θ and is incident on liquid crystal panel 604. Light passing a segment switched to a light transmitting state in segment display unit 600a of liquid crystal panel 604 illuminates the corresponding light transmitting segment of the light transmitting part 622a of light mask 622. The distance between segment display unit 600a of liquid crystal panel 604, and light transmitting part 622a of light mask 622, is equivalent to the thickness of emission-side electrode plate 602 and emission-side polarization plate 606. Light passing liquid crystal panel 604 thus forms on light transmitting part 622a of light mask 622 an illuminated area all of which is offset in a direction moving away from the spectral axis 51a of the transmitted light. Light transmitting part 622a of light mask 622 is formed in the present embodiment so that each light transmitting segment thereof is positioned within this offset illuminated area.

FIG. 5B is an enlarged view of the area inside the dotted circle in FIG. 5A, i.e., the area of a light transmitting segment positioned at one end of light transmitting part 622a of light mask 622 farthest from spectral axis 51a. The segment 630 is a segment of the segment display unit 600a formed in liquid crystal material 603 between a pair of electrode plates 601 and 602 in liquid crystal panel 604 as described above according to the present invention.

The transmission width of segment 630 is indicated by two dotted lines in FIG. 5. If the refractive index of the liquid crystal panel 604 components is ignored, light transmitted by segment 630 passes at the diffusion angle θ of the emitted light. As a result, the light passing segment 630 forms an illumination area 640 on the light transmitting part 622a of the light mask 622 surface at a position offset from segment 630 in a direction moving away from spectral axis 51a.

It should be noted that of the plurality of light transmitting segments comprising light transmitting part 622a formed on the mask surface of light mask 622, light transmitting segment 660 corresponding to segment 630 on the liquid crystal panel side is formed and positioned to be within said illumination area 640 in a camera data imprinting apparatus 1 according to the present invention. This means that light transmitting segment 660 is formed at a position shifted in the orientation direction of the data pattern away from spectral axis 51a with the distance of this shift equal to the offset of illumination area 640.

Unlike the situation that can occur with a camera data imprinting apparatus according to the related technology as shown in FIG. 9, no part of light transmitting segment 660 is formed in an area not contained within illumination area 640. Effects such as a partial dropout of the imprinted data pattern, and loss of image sharpness due to insufficient exposure, therefore do not occur.

It should be noted that the shifted positioning of light transmitting segments formed on the light mask at the ends of the data pattern as described above is not limited to light transmitting segment 660, and a plurality of such light transmitting segments is thus formed to be within the illumination area of light passing a corresponding segment of the liquid crystal panel as shown in FIG. 5C.

As shown in FIG. 6, the relative positions of light transmitting segments in other parts of the light mask are also formed to be within the illumination area of light passing a corresponding segment of the liquid crystal panel. Note that in FIG. 6 the light transmitting segments of the light mask are indicated by a solid line, the area of the corresponding segment on the liquid crystal panel side is indicated by a dot-dot-dash line, and the illuminated area formed on the light mask by light transmitted through a corresponding segment on the liquid crystal panel is indicated by a dotted line.

It should be noted that the refraction of light by the component members of the liquid crystal panel and other parts has been ignored in the preceding description for convenience of the explanation only. In practice, however, refraction by the various components positioned along the optical path from data imprinting light source 51 to the light transmitting segment 660 of light mask 622 is preferably also considered in determining the position of light transmitting segment 660 The relative positions of segment 630 of liquid crystal panel 604 and light transmitting segment 660 of light mask 622 can be determined by first determining the position of one, and then determining the required position of the other based on and relative to the first. Either side can therefore be used as the base reference.

It should also be noted that the relationship between the position of liquid crystal panel segment 630 and light transmitting segment 660 on the light mask is described with consideration only for the orientation direction of the data pattern (shown as arrow A in FIG. 6). This is because the imprinted data pattern is generally a single linear sequence of one or more letters, numbers, or symbols, and in the direction transverse (shown as arrow B in FIG. 6) to this linear data pattern arrangement the pattern is the size of only one letter, number, or symbol. The probability of any practical problems arising as a result of not considering an offset in this transverse direction is therefore low. However, a further increase in the sharpness of the imprinted data pattern can obviously be expected if an offset in this transverse direction is also considered.

It will also be evident that the present invention can be applied to a camera data imprinting apparatus comprising a liquid crystal display built differently from the data imprinting LCD 6 described above. More specifically, the present invention can also be applied to a camera data imprinting apparatus comprising a liquid crystal display in which the light mask is provided on the light incidence side of the liquid crystal panel as shown in FIG. 8B.

As described above, light transmitting segments formed on the light mask of a liquid crystal display device in a camera data imprinting apparatus according to the present invention are formed to be within the area of the light mask illuminated by light passing through segments of the liquid crystal panel switched to a light transmitting state. Alternatively, the camera data imprinting apparatus of the invention is comprised so that the area on the liquid crystal panel illuminated by light passing a light transmitting segment of the light mask is within the area of a corresponding segment of the liquid crystal panel.

It is therefore possible with the present invention to avoid image dropout or loss of image sharpness due to insufficient exposure in part of the data pattern imprinted to photographic film when the path length from the data imprinting light source to the liquid crystal panel is shortened, when the diffusion angle of light emitted from the light source increases, or when the index of refraction of the liquid crystal panel or components along the optical path changes significantly.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A data imprinting apparatus for a camera for forming a data pattern to be imprinted on photographic film, comprising a liquid crystal panel comprising plural segments that are switchable to a light transmitting state, and a light mask comprising plural light transmitting segments corresponding to an imprintable data pattern, and wherein data is imprinted by exposing an imprinting surface of the photographic film to emitted light from a light source passed through said liquid crystal panel and said light mask;

wherein said light mask is disposed on a light emitting side of said liquid crystal panel; and at least one light transmitting segment of said light mask is formed in a position offset relative to a corresponding segment of said liquid crystal panel in a direction perpendicular to an optical axis of the emitted light such that said light transmitting segment of said light mask is within an area of said light mask illuminated by light emitted from said corresponding liquid crystal panel segment.

2. A data imprinting apparatus for a camera according to claim 1, wherein said light transmitting segment is formed in a position relative to a corresponding liquid crystal panel segment offset in a direction away from the optical axis in an orientation direction of the imprintable data pattern.

3. A data imprinting apparatus for a camera according to claim 2 wherein said relative offset between said light transmitting segment and a liquid crystal panel segment corresponding thereto is a function of at least one of a diffusion angle of the emitted light, a refractive index of an optical path from the light source to said light mask, and a refraction index of an optical path from the light source to said liquid crystal panel.

4. A data imprinting apparatus for a camera according to claim 1, wherein said relative offset between said light transmitting segment and a liquid crystal panel segment corresponding thereto is a function at least one of a diffusion angle of the emitted light, a refractive index of an optical path from the light source to said light mask, and a refraction index of an optical path from the light source to said liquid crystal panel.

5. A data imprinting apparatus for a camera for forming a data pattern to be imprinted on photographic film, comprising a liquid crystal panel comprising plural segments that are switchable to a light transmitting state, and a light mask comprising plural light transmitting segments corresponding to an imprintable data pattern, and wherein data is imprinted by exposing an imprinting surface of the photographic film to emitted light from a light source passed through said liquid crystal panel and said light mask;

wherein said light mask is disposed on a light incidence side of said liquid crystal panel; and at least one segment of said liquid crystal panel is formed in a position offset relative to a corresponding light transmitting segment of said light mask in a direction perpendicular to an optical axis of the emitted light such that an area of said liquid crystal panel illuminated by the light transmitted by said light transmitting segment of said light mask is within the liquid crystal panel segment.

6. A data imprinting apparatus for a camera according to claim 5, wherein said light transmitting segment is formed in a position relative to a corresponding liquid panel segment offset in a direction away from the optical axis in an orientation direction of the imprintable data pattern.

7. A data imprinting apparatus for a camera according to claim 6, wherein said relative offset between said light transmitting segment and a liquid crystal panel segment corresponding thereto is a function of at least one of a diffusion angle of the emitted light, a refractive index of an optical path from the light source to said light mask, and a refraction index of an optical path from the light source to said liquid crystal panel.

8. A data imprinting apparatus for a camera according to claim 5, wherein the relative offset between said light transmitting segment and a liquid crystal panel segment corresponding thereto is a function of at least one of a diffusion angle of the emitted light, a refractive index of an optical path from the light source to said light mask, and a refraction index of an optical path from the light source of said liquid crystal panel.

\* \* \* \* \*